(12) United States Patent
Nevermann (10) Patent No.: US 7,146,139 B2
(45) Date of Patent: Dec. 5, 2006

(54) SYSTEM AND METHOD FOR REDUCING SAR VALUES

(75) Inventor: Peter Nevermann, San Diego, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 922 days.

(21) Appl. No.: 09/967,776

(22) Filed: Sep. 28, 2001

(65) Prior Publication Data

US 2003/0064761 A1 Apr. 3, 2003

(51) Int. Cl.
 *H03C 1/62* (2006.01)
 *H04B 1/04* (2006.01)
 *H04B 7/00* (2006.01)

(52) U.S. Cl. ............... 455/115; 455/126; 455/552; 455/67.11; 455/127.1; 343/702

(58) Field of Classification Search ........... 455/522, 455/552, 575.5, 575.7, 115.1, 155.2–115.4, 455/126, 127.1, 127.2, 67.11; 343/702
See application file for complete search history.

(56) References Cited

U.S. PATENT DOCUMENTS

| | | | | |
|---|---|---|---|---|
| 4,384,819 A * | 5/1983 | Baker | ............... | 415/14 |
| 5,335,366 A | 8/1994 | Daniels | ............... | 455/89 |
| 5,367,309 A | 11/1994 | Tashjian | ............... | 343/702 |
| 5,459,405 A * | 10/1995 | Wolff et al. | ............... | 324/644 |
| 5,524,275 A | 6/1996 | Lindell | | |
| 5,613,221 A | 3/1997 | Hunt | ............... | 455/89 |
| 5,668,070 A | 9/1997 | Hong et al. | ............... | 501/126 |
| 5,726,383 A | 3/1998 | Geller et al. | ............... | 174/35 R |
| 5,862,458 A * | 1/1999 | Ishii | ............... | 455/107 |
| 5,956,626 A * | 9/1999 | Kaschke et al. | ............... | 455/115.1 |
| 6,018,646 A * | 1/2000 | Myllymaki et al. | ............... | 455/115.4 |
| 6,195,532 B1 * | 2/2001 | Bamburak et al. | ............... | 455/161.3 |
| 6,195,562 B1 * | 2/2001 | Pirhonen et al. | ............... | 455/553.1 |
| 6,529,088 B1 * | 3/2003 | Lafleur et al. | ............... | 455/73 |
| 6,633,766 B1 * | 10/2003 | van der Pol | ............... | 455/522 |
| 6,678,532 B1 * | 1/2004 | Mizoguchi | ............... | 455/550.1 |

FOREIGN PATENT DOCUMENTS

| | | |
|---|---|---|
| DE | 199 07 431 A 1 | 8/2000 |
| DE | 199 07 572 A 1 | 9/2000 |
| EP | 1 156 591 A1 | 11/2001 |
| WO | WO 95/03549 | 2/1995 |

OTHER PUBLICATIONS

"Wave Buster Makes Your Mobile Safer!"; http://www.wavebuster.com; Sep. 17, 2001.
"SAR Shield Inc."; http://www.sarshield.com; Sep. 17, 2001.

* cited by examiner

*Primary Examiner*—Lester G. Kincaid
*Assistant Examiner*—Fred A. Casca (57) ABSTRACT

A system and method for reducing the Specific Absorption Rate (SAR) of a mobile communication device employs a sensor assembly for sensing when the mobile communication device is in proximity to a body such as a human body, animal body, or the like. The average power of the radio frequency electromagnetic energy radiated by the mobile communication device may then be reduced only when necessary so that the SAR value for the device is maintained below a predetermined acceptable level.

33 Claims, 6 Drawing Sheets

SYSTEM AND METHOD FOR REDUCING SAR VALUES

BACKGROUND OF THE INVENTION

The present invention relates generally to mobile communication devices such as mobile telephones and the like, and more specifically to a system and method for reducing the Specific Absorption Rate (SAR) of a mobile communication device by controlling the average power of radio frequency electromagnetic energy radiated by the device when the device is in proximity to a human body.

Compact mobile telephones in common use today employ a radio transceiver (a combination of transmitter and receiver) that uses radio frequency electromagnetic waves to communicate with fixed installations, called base stations. Typically, these base stations are networked to a central switching station that directs mobile telephone calls to the desired location. In existing networks, each base station is capable of measuring the received signal strength from a mobile telephone. If the received signal is determined to be strong, for example, when the mobile telephone is close to the base station, the base station may advise the mobile telephone to utilize a lower power setting (i.e., to reduce the power of the radio frequency electromagnetic energy being radiated). In this manner, less battery power is consumed by the mobile telephone allowing longer talk time.

It is known that exposure to very high levels of radio frequency electromagnetic energy, particularly at microwave frequencies, can heat biological tissue causing harm by increasing body temperature, disrupting behavior, and damaging biological tissue. Consequently, the effect of low levels of radio frequency energy, such as produced by mobile telephones, on human tissue has also come under intense scientific investigation. While there is no scientific proof that the relatively low levels of radio frequency energy produced by mobile telephones can cause damage to human tissue, many governmental bodies, such as the United States Federal Communication Commission (FCC) and many European regulatory organizations, have nevertheless imposed precautionary regulations and measurement guidelines aimed at limiting the exposure of users to such energy.

Accordingly, before a mobile telephone can be marketed, it typically must comply with maximum heating capacity guidelines imposed by such governmental regulating organizations. For instance, in the United States and Europe, the telephone must meet various technical standards, including compliance with radio frequency exposure limits defined in terms of the telephone's specific absorption rate (SAR). SAR is a widely accepted measurement of radio frequency energy absorbed into the body in watts per kilogram (W/kg) averaged over a certain amount of tissue when the telephone is situated close to the human body.

In general, the SAR value of a mobile telephone depends on the average radiated power of the telephone, frequency (because of different antenna properties and material properties of the human tissue at different frequencies) and geometrical and mechanical configurations of the telephone. SAR values are most affected by the distance between any radiating structure to the human tissue and the average radiated power. The average radiated power depends on the communication standard utilized, and may vary within the standard depending on the traffic mode in use. Thus, for example, a GSM (Global System for Mobile Communication) mobile telephone will have different average radiated power levels due to a different number of used timeslots in the GPRS (General Packet Radio Service) data transfer mode and a different power level setting in terms of peak power in the used timeslots.

Existing concepts used for reducing the SAR value of a mobile telephone are based on three ideas: adding reflective shielding to the mobile telephone, creating distance between the antenna of the telephone and the human body, and reducing the radiated power of the telephone through incorporation of absorbing materials within the telephone's housing. However, these concepts do not account for different modes of operation of the mobile telephone. Further, they generally have a negative impact either on the design of the mobile telephone, or on the quality of the communication link between the mobile telephone and the base station. For instance, creating distance between the antenna of the telephone and the human body is contrary to typical requirements that the mobile telephone be extremely compact. Further, reflecting devices cut any radio frequency link in the direction of the shield even in situations where no human body is present (e.g., when the mobile telephone is being used as a modem). Such devices further reduce the ability of the telephone to maintain an existing link when the user alters the telephone's orientation. Similarly, absorbing devices reduce the available radiated energy of the telephone limiting the area in which the mobile telephone may be used (i.e., reduce the coverage area of the telephone).

Consequently, there is a general need for systems and methods for lowering the SAR values of mobile telephones in all modes while limiting the impact to mechanical design of the telephone and providing maximum available radiated power when needed to furnish a good communication link in poor environments (e.g. within buildings, where large distances exist between the mobile telephone and base station, and the like).

SUMMARY OF THE INVENTION

Accordingly, the present invention is directed to a system and method for reducing the Specific Absorption Rate (SAR) of a mobile communication device by controlling the average power of radio frequency electromagnetic energy radiated by the device when it is in proximity to a human body.

According to a specific embodiment, the present invention provides a system for controlling the average power and duration of radio frequency electromagnetic energy radiated by a mobile communication device. The system includes a sensor assembly for detecting when the mobile communication device is in proximity to a body, and a controller for controlling radiation of radio frequency electromagnetic energy by the mobile communication device. The controller is capable of reducing at least one of the average power and the duration of the radio frequency electromagnetic energy radiated by the mobile communication device when the sensor assembly senses that the mobile communication device is in proximity to the body.

According to another specific embodiment, the present invention provides a system for controlling the average power of radio frequency electromagnetic energy radiated by a mobile communication device. The mobile communication device is capable of operating in a first mode wherein the mobile communication device is suitable for use in proximity to a human body, and in a second mode wherein the mobile communication device is unsuitable for use in proximity to the human body. The system includes a sensor assembly for detecting when the mobile communication device is in proximity to the human body, and a controller for controlling radiation of radio frequency electromagnetic energy by the mobile communication device. The controller is capable of reducing the average power of the radio frequency electromagnetic energy radiated by the mobile communication device when the mobile communication device is in the second mode and the sensor assembly senses that the mobile communication device is in proximity to the human body.

According to another specific embodiment, the present invention provides a method for controlling the SAR value of a mobile communication device that is capable of operating in a first mode wherein the mobile communication device is suitable for use in proximity to a human body and a second mode wherein the mobile communication device is unsuitable for use in proximity to the human body. The method includes steps of determining whether the mobile communication device is operating in the first mode or the second mode, sensing when the mobile communication device is in proximity to the human body, and reducing the average radiated power of the mobile communication device when the mobile communication device is in the second mode and is in proximity to the human body.

According to yet another specific embodiment, the present invention provides a mobile communication device capable of operating in a first mode wherein the mobile communication device is suitable for use in proximity to a human body and a second mode wherein the mobile communication device is unsuitable for use in proximity to the human body. The mobile communication device includes a sensor assembly for detecting when the mobile communication device is in proximity to the human body, and a controller for controlling radiation of radio frequency electromagnetic energy by the mobile communication device. The controller is capable of reducing at least one of the average power and duration of the radio frequency electromagnetic energy radiated by the mobile communication device when the mobile communication device is in the second mode and the sensor assembly senses that the mobile communication device is in proximity to the human body.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

In a first aspect of the invention, a system is provided for controlling the average power of radio frequency electromagnetic energy radiated by a mobile communication device. The system includes a controller for controlling radiation of radio frequency electromagnetic energy by the mobile communication device, and a sensor assembly for sensing when the mobile communication device is in proximity to a body such as a human body, animal body, or the like. The controller is capable of reducing the power (or duration) of the radio frequency electromagnetic energy radiated by the mobile communication device when the sensor assembly senses that the mobile communication device is in proximity to a body. By reducing the average radiated power of the mobile communication device when it is in proximity of a body, the SAR value for the device is reduced, if such reduction is necessary.

In exemplary embodiments of the invention, the mobile communication device may be capable of operation in multiple modes including at least one mode wherein the device is suitable for use in proximity to a human body and at least one mode wherein the device would normally be unsuitable for use in proximity to a human body due to the power of the radio frequency electromagnetic energy being radiated were the power not reduced. In such embodiments, the controller may reduce the average radiated power of the mobile communication device due to the proximity of a human body only when the device is operating in a mode wherein the device is normally unsuitable for use in proximity to the human body.

In a second aspect of the invention, a method is provided for controlling SAR value of a mobile communication device by controlling the average power of radio frequency electromagnetic energy radiated by the device. In exemplary embodiments, the method includes steps for sensing when the mobile communication device is in proximity to a human body and reducing the average radiated power of the device when the device is in proximity to the body. In embodiments where the mobile communication device is capable of operating in a first mode wherein the device is suitable for use in proximity to a human body and a second mode wherein the device is unsuitable for use in proximity to a human body, the method may further include the step of determining whether the mobile communication device is operating in the first mode or the second mode, whereupon the radiated power of the mobile communication device may be reduced only when the device is operating in the second mode and is in proximity to a human body.

Reference will now be made in detail to the presently preferred embodiments of the invention, examples of which are illustrated in the accompanying drawings.

Figure 1:
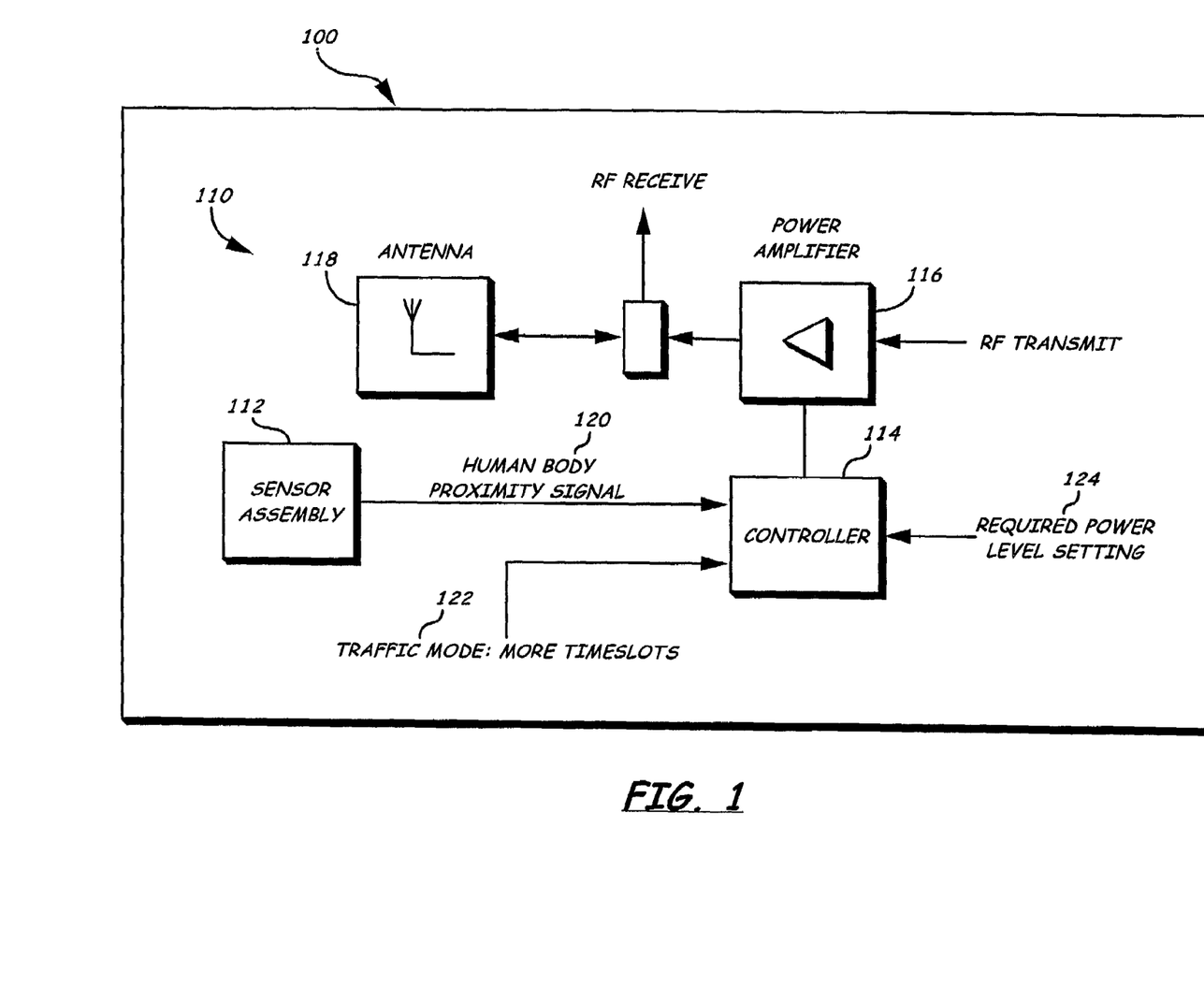
FIG. 1 is a block diagram illustrating a system for reducing the SAR value of a mobile communication device by reducing the average power of radio frequency electromagnetic energy radiated by the device when the device is in proximity to a human body in accordance with an exemplary embodiment of the present invention.

FIG. 1 illustrates an exemplary mobile communication device 100, in particular, a compact mobile telephone or the like, employing a system 110 for reducing the average power of radio frequency electromagnetic energy radiated by the device when the device is in proximity to a human body. The system 110 includes a sensor assembly 112 for sensing when the mobile communication device 100 is in proximity to the body. The system further includes a controller 114 that controls the radiated power of the mobile communication device 100 by adjusting the power of radio frequency electromagnetic energy produced by power amplifier 116 and thereafter radiated by antenna 118. In accordance with the present invention, the controller 114 is capable of reducing the average radiated power of the mobile communication device 100 (by reducing the power of radio frequency electromagnetic energy produced by power amplifier 106 and radiated by antenna 118 or, reducing the time during which the energy is radiated, i.e., the duration of the radio frequency electromagnetic energy) when the sensor assembly senses that the mobile communication device is in proximity to a human body. Preferably, when the sensor assembly 112 senses that the mobile communication device 100 is no longer in proximity to the body, the power may again be increased.

In the exemplary embodiment shown in FIG. 1, sensor assembly 112 provides a signal ("HUMAN BODY PROXIMITY SIGNAL") 120 for indicating the presence of a human body in proximity of the mobile communication device 100. The controller 114 utilizes the human body proximity signal 120 together with information describing radiated power of the mobile communication device for determining whether a reduction in the power or duration of energy radiated by the device is necessary, and, if necessary, to what extent. In this manner, the system 110 continually monitors and adjusts the power level of the mobile communication device 100 so that the power of radio frequency electromagnetic energy being radiated never causes the device to violate acceptable SAR value limits (e.g., as imposed by governmental regulating bodies, consumer groups, or the like).

In exemplary embodiments of the invention, mobile communication device 100 may be capable of operation in multiple modes including at least one mode wherein the device is suitable for use in proximity to a human body and at least one mode wherein the device is unsuitable for use in proximity to a human body due to the power of the radio frequency electromagnetic energy normally being radiated. For instance, in one embodiment, the mobile communication device 100 may comprise a mobile telephone employing a suitable air interface standard such as the Global System for Mobile Telecommunications (GSM) air interface standard, the enhanced Global System for Mobile Telecommunications (EGSM) air interface standard, a Personal Communication System (PCS) air interface standard, or the Telecommunications Industry Association/Electronics Industry Alliance Interim Standard 136 (IS-136) Time Division Multiple Access (TDMA) air interface standard, which may support a data transfer service such as the General Packet Radio Service (GPRS), or the like. In such an embodiment, the mobile communication device 100 may be capable of operating in a first traffic mode suitable for communication of voice information (e.g., a "talk mode"), and a second traffic mode suitable for communication of data (e.g., a "data transmission mode"). For example, an exemplary mobile communication device 100 employing an EGSM air interface standard may use a radio frequency spectrum band of 880–915 MHz for uplink (Tx) and a band of 925–960 MHz for downlink (Rx). The EGSM air interface standard employs a combination of Time-and Frequency-Division Multiple Access (TDMA/FDMA) technologies wherein the frequency of the total 35 MHz bandwidth is divided into 174 carrier frequencies of 200 kHz bandwidth each. These carrier frequencies are further divided in time, using a TDMA scheme, into eight time slots. For voice communication when the mobile communication device is in talk mode, one time slot is used for transmission (Tx) by the device and one for reception (Rx). These timeslots are separated in time so that the mobile communication device 100 does not receive and transmit at the same time. When in data transfer mode, the mobile communication device 100 may be employed in a variety of data transmission applications. For example, the mobile communication device may be utilized as a wireless modem for a portable computer, or as an appliance for accessing a network such as the Internet, or the like. Accordingly, the data transfer service employed (e.g., GPRS) may allow additional timeslots to be dedicated to transfer of data to achieve higher data transfer rates. For example, utilizing GPRS, a theoretical maximum data transfer rate of up to 171.2 kilobits per second (kbps) may be achieved using all eight TDMA timeslots at the same time.

When mobile communication device 100 is in the talk mode, the power of radio frequency energy radiated is limited, allowing the device to be held against the ear, cheek and mouth of the user in a "talk" position. However, when the mobile communication device 100 is in a data transmission mode, it may be desirable that the average power of radio frequency energy radiated be increased to provide a sufficient communication link for transfer of data, e.g., using more than one time slot. Typically, in such data transfer modes, the mobile communication device 100 is positioned away from the body of the user (or other human or animal body). For example, where the mobile communication device 100 is utilized as a wireless modem for a portable computer, the device may be positioned on a tabletop adjacent to the computer, in a seat or chair next to the user, or the like. Nevertheless, at times, the mobile communication device 100 may inadvertently be placed in proximity to a human body when in the data transfer mode (e.g., the device is placed in the talk position to make a call), possibly resulting in exposure of the body to radio frequency electromagnetic energy radiated at high power. This exposure may increase the SAR value for the mobile communication device 100 above a specified limit.

In such cases, controller 114 may reduce the average radiated power of the mobile communication device 100 due to the proximity of a human body only when the device is operating in a mode wherein the device would normally be unsuitable for use in proximity to the body due to the power or duration of the radio frequency energy radiated. In this manner, the average radiated power of the mobile communication device is selectively reduced only when necessary to prevent unnecessary exposure of the user or others around the device to high frequency (microwave) radiation.

As shown in FIG. 1, a traffic mode signal ("TRAFFIC MODE: MORE TIMESLOTS") 122 is furnished to system 110 by the mobile communication device 100. The traffic mode signal 122 describes the traffic mode in which the mobile communication device 100 is operating. For instance, in embodiments of the invention wherein the mobile communication device 100 employs a GSM, EGSM, or IS-136 TDMA air interface standard utilizing a GPRS data transfer protocol, the traffic mode signal 122 may indicate the number of timeslots to be used for the required data rate. In a talk mode, mobile communication device 100 is transmitting voice information or, alternately, data information at a low data transmission rate (e.g., Short Message Service (SMS) data, or the like) utilizing a single timeslot. In a data transmission mode, the mobile communication device 100 may employ additional timeslots for transmission of data information at higher data transmission rates (e.g., the mobile communication device is being utilized as a wireless modem for email, Internet browsing, or the like). Transmission of data information utilizing additional TDMA timeslots results in increased average power of the radio frequency energy being radiated by the mobile communication device 100.

A signal ("REQUIRED POWER LEVEL SETTING") 124 may also be furnished to the system 110 by the mobile communication device 100. In the exemplary embodiment shown, the required power level setting signal 124 describes the power of the radio frequency energy necessary to provide adequate signal strength for maintaining a communication link with a base station. The controller 114 utilizes this signal for determining the current power level of the mobile communication device 100 (i.e., the power of the radio frequency energy being produced by power amplifier 116). This power level is usually commanded by the base station in order to set the output power of the mobile communication device 100 to the lowest possible level to maintain the communication link and avoid unnecessary interference, and also to conserve the battery power of the device thereby increasing talk time.

In the exemplary embodiment shown, the system 110 utilizes the human body proximity signal 120 provided by sensor assembly 112, together with the information about the current power level and the active traffic mode provided the traffic mode signal 122 and required power level setting signal 124 to ascertain the average power level of the mobile communication device 100, and to determine whether a reduction in the power level or duration at that power level is necessary and to what extent. In this manner, the average power of radio frequency energy radiated by the mobile communication device 100 is reduced only when needed (i.e., when a human body is in proximity to the antenna 118 of mobile communication device 100 and the device is operating at a power level wherein separation of the device from the body is desirable). Thus, it becomes possible to adjust the average power level of the mobile communication device 100 to avoid violating established SAR limits with minimum impact to normal function of the device.

As shown in FIG. 1, the controller 114 is provided with the human body proximity signal 120, the traffic mode signal 122, and required power level setting signal 124. The controller 114 uses these signals for determining when reduction of the power of the mobile communication device 100 is necessary. For instance, in exemplary embodiments, when the human body proximity signal 120 indicates that the mobile communication device 100 is in proximity to a human body with respect to the power being radiated by the device as indicated by the required power level setting signal 124, and information provided by the traffic mode signal 122 about the number of time slots being used indicates that the power being radiated may be expected to make the device unsuitable for use in proximity to the body, action such a reduction of the average power radiated by mobile communication device 100 is required. However, when the human body proximity signal 120 indicates that the mobile communication device 100 is not in proximity to a human body or the traffic mode signal 122 indicates that the device is in a talk mode (i.e., only one TDMA timeslot is utilized during transmission) or, alternately, in a data transmission mode wherein the required power level setting signal 124 indicates that the power being radiated is sufficiently low so that the device is suitable for use in proximity to the body, no action is required.

If the controller 114 determines that reduction of the average power of the mobile communication device 100 is necessary, controller 114 effects a reduction in the power level accordingly by reducing the power of radio frequency electromagnetic energy produced by power amplifier 116. In exemplary embodiments, the controller 114 may step the power emitted during each time slot down to a level wherein the average power of radio frequency electromagnetic energy being radiated the mobile communication device 100 does not cause the device to exceed a predetermined SAR limit. For example, in embodiments where the mobile communication device utilizes the GSM air interface, the power level may be stepped down in increments having a step height of 2 dB from the peak power for the device to a minimum of 13 dBm (20 milliwatts).

Controller 114 may further determine the extent of reduction in the power level possible based on a required power level setting signal 124 provided by the mobile communication device 100. If the reduction in the power level necessary to avoid causing the mobile communication device 100 to exceed an acceptable SAR limit would cause the power level to fall below the required power level needed to maintain adequate signal strength, the controller 114 may cause the power level to be reduced only to the point necessary to maintain adequate signal strength for a limited time, if allowed by governmental regulations, before further reducing the power level as necessary. In such situations, the controller 114 may limit the duration of the radio frequency energy by preventing the use of multiple timeslots or reduce the number of timeslots in use by the mobile communication device 100. The controller 114 may further cause a warning to be provided to the user (e.g. by causing a warning to be displayed on the mobile communication device's display or the like). In this manner, overall reduction of the SAR value for the mobile communication device is achieved without compromising the integrity of the communication link. Alternately, the controller 114 may reduce the average power level as required to achieve an acceptable SAR value regardless of signal strength, in which case the communication link may be dropped.

Figure 2:
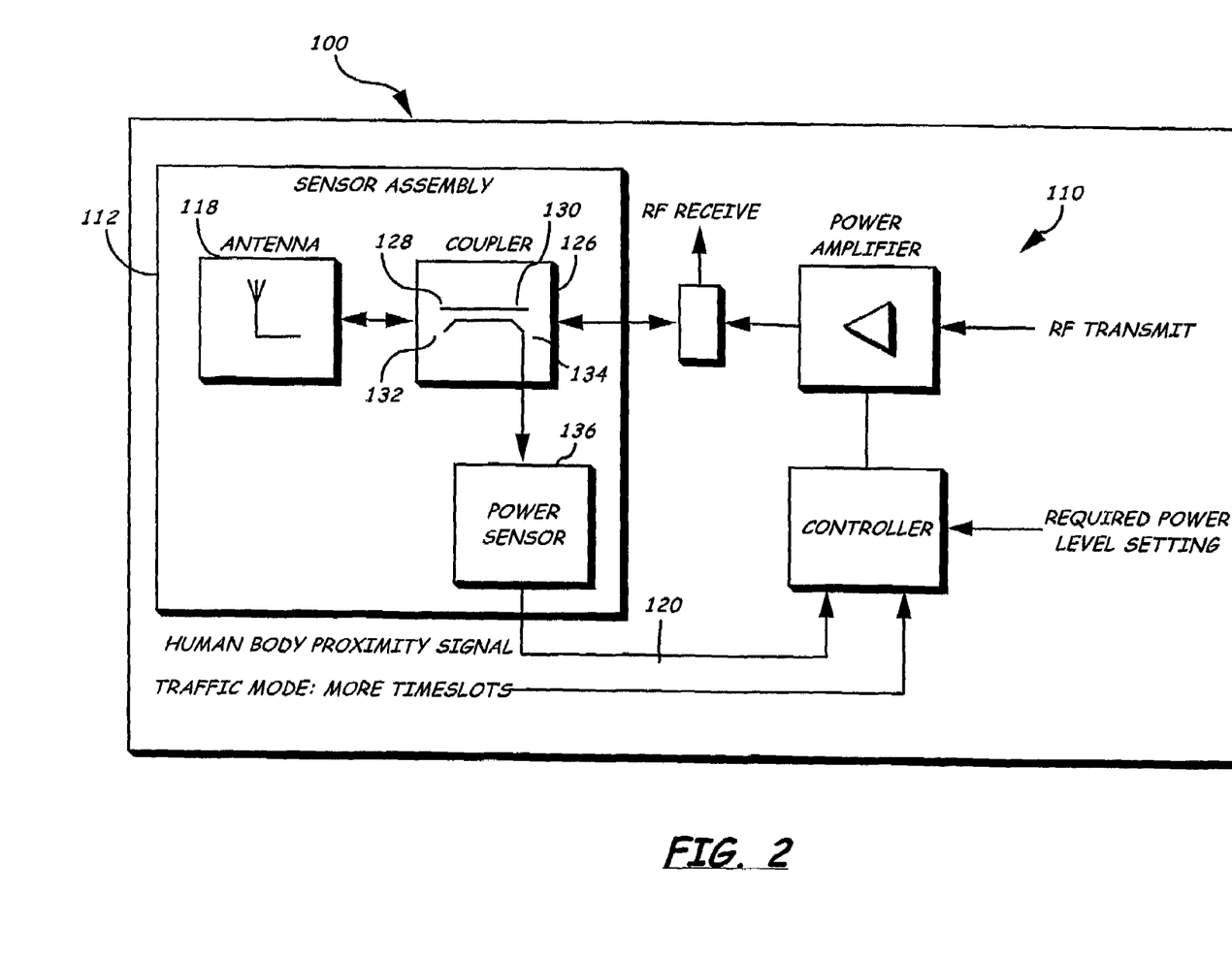
FIG. 2 is a block diagram further illustrating an exemplary sensor assembly of the system shown in FIG. 1, wherein the antenna of the mobile communication device is utilized for sensing proximity of the device to a human body.

Referring now to FIG. 2, an exemplary sensor assembly 112 is described. When used in proximity to a lossy dielectric body such as a human body, the antenna of a mobile communication device will change its radio frequency properties in terms of impedance and the amount of energy reflected. In embodiments of the present invention, the sensor assembly 112 senses the presence of a human body by measuring the power of radio frequency electromagnetic energy reflected by an antenna within a predetermined frequency band, in particular, a transmit band (Tx) of the mobile communication device 100 employing the system 110. Thus, in effect, the sensor assembly 112 measures the amount of interaction between the human body and the antenna including the losses of radiated radio frequency electromagnetic energy described by the device's SAR value.

In the exemplary embodiment shown in FIG. 2, the sensor assembly 112 includes the antenna 118 of the mobile communication device 100, a directional coupler 126 having multiple radio frequency (RF) ports (a directional coupler 126 having four RF ports 128, 130, 132 and 134 is shown) and at least one detector or power sensor 136 for sensing radio frequency electromagnetic energy within a predetermined frequency band (such as a transmit band (Tx) of the mobile communication device 100). An energy source such as, for example, the power amplifier of a mobile telephone transmitter, is coupled to the antenna 118 for transmitting signals via the antenna 118. The power amplifier delivers radio frequency electromagnetic energy to the antenna via an antenna feed such as a feed-line (e.g., a cable, wire, coplanar line, etc.), a feed network, or the like (RF TRANSMIT/RECEIVE). The antenna and antenna feed each have a characteristic impedance, or opposition to electrical current. In an ideal situation, the impedances of the antenna and antenna feed match perfectly, and all of the electromagnetic energy sent to the antenna is converted to radio energy and radiated into the atmosphere. However, in less than ideal situations, when the impedances are not perfectly matched, some of the electromagnetic energy sent to the antenna is not converted to radio energy, but is instead reflected back along the antenna feed.

The impedance of the antenna is altered by the presence of conductive bodies (e.g., a human body, an animal body, or the like) within the region in immediate proximity to the antenna. This region, in which a change in geometry of conductive bodies in proximity to the antenna will change the impedance of the antenna and therefore the amount of reflected electromagnetic energy, is referred to in the art as the "reactive near field."

The presence of a medium other than air (e.g., a part of a human body) in the vicinity of the antenna 118 (i.e., within the reactive near field) changes the impedance of the antenna and thus changes the amount of energy reflected byte antenna 118 within a certain frequency band. Using the directional coupler 126, a part of this reflected energy is made available, at RF port 134, to power sensor 136. The power sensor 136 senses this energy and generates the human body proximity signal ("HUMAN BODY PROXIMITY SIGNAL") 120 in response thereto for indicating the presence or absence of a human body within proximity to the mobile communication device 100 based on the power of the radio frequency electromagnetic energy reflected.

In one embodiment, antenna 118 is slightly detuned so that it is not perfectly matched to a free space environment. Preferably, antenna 118 is detuned so that less radio frequency energy is reflected within a predetermined frequency band (i.e., the transmit band (Tx) of the mobile communication device 100) when the device is in proximity to a lossy dielectric body such as a part of a human body, or the like. The lack of or reduced power of radio frequency electromagnetic energy reflected by the antenna 118 within the frequency band thus indicates the presence of a human body in proximity to the mobile communication device 100.

Figure 3:
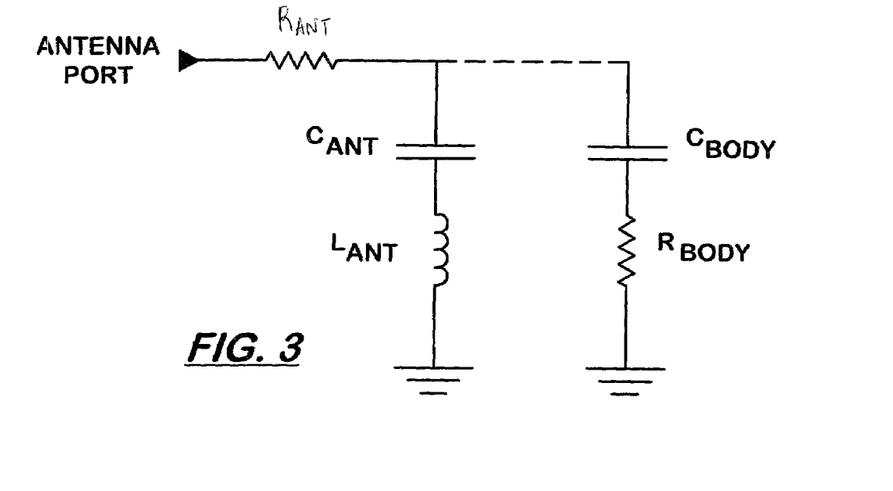
FIG. 3 is a circuit diagram illustrating a small signal equivalent circuit describing a detuned antenna and a human body in close proximity to the mobile communication device.

FIG. 3 illustrates a small signal equivalent circuit describing the antenna 118 of mobile communication device 100 and a human body in close proximity to the mobile communication device 100 wherein the antenna has been detuned. The equivalent circuit is comprised of a resistor $R_{ANT}$ (radiation), a capacitor $C_{ANT}$ and an inductor $L_{ANT}$ modeling the resonance frequency of the antenna. Typically, the antenna 118 of a mobile communication device 100 is designed to reach a real part of its impedance at approximately 50 Ohms in order to match the power amplifier 116 (FIG. 1). The presence of a part of a human body (e.g., the user's head) may be approximated by an additional lossy capacitance described by capacitor $C_{BODY}$ and resistor $R_{BODY}$. By taking this lossy capacitance into account, the antenna 118 may be detuned by selecting an appropriate resistor $R_{ANT}$ so that the antenna 118 reaches the real part of its impedance at 50 Ohms at the antenna port only when it is in proximity to a lossy dielectric body (e.g., a human body, animal body, or the like).

It will be appreciated that by detuning the antenna of a mobile communication device, the overall radio frequency (RF) performance of the device is generally reduced. However, it has been found that, depending on the accuracy of the power sensor and antenna parameter tolerances used, the antenna 118 of an exemplary mobile communication device 100 employing an EGSM air interface may be detuned so that the antenna's reflection coefficient ("$|S_{11}|$") is in the range of −7.5 dB instead of −12 dB (see FIG. 4) with reduced performance of as little as approximately 0.6 dB. Such reduced performance approaches the minimum limit of degradation that can be measured for radiated emission, and is thus almost negligible in practical applications. Consequently, the antenna 118 of a mobile communication device 100 may be detuned sufficiently for use by the sensor assembly 112 with little impact on the performance of the device.

Alternately, the controller 114 (FIG. 2) may determine a more accurate reflection coefficient $|S_{11}|$ for the antenna 118. This can be done using one of the other control signals (such as the required power level setting signal) to get the radio frequency transmit level or by measuring with an additional power sensor (not shown in FIG. 2) at the other coupler port 132, in order to improve accuracy. The controller 114 can then compare the determined reflection coefficient $|S_{11}|$ with the expected reflection coefficient for the antenna 118 in free space. If the determined reflection coefficient $|S_{11}|$ deviates sufficiently from the reflection coefficient for the antenna in free space, the controller may determine that the mobile communication device 100 is in proximity to a human body. In such embodiments, it is necessary to define the range of reflection coefficients $|S_{11}|$ for the antenna 118 within the transmit band (Tx) of the mobile communication device 100 where the antenna 118 is not in proximity to a human body. This range of reflection coefficients $|S_{11}|$ is bounded by a lower threshold reflection coefficient $|S_{11}|$ and an upper threshold reflection coefficient $|S_{11}|$. For example, in FIG. 5, reflection coefficients $|S_{11}|$ for an exemplary mobile telephone antenna are illustrated for different positions of the telephone positions (i.e., in free space, held in a talk position, held in a body position, and lying on a table) are shown. As shown by the shaded region, the range of reflection coefficients $|S_{11}|$ for the mobile communication device, where the antenna may be safely assumed to be not in proximity to a human body is bounded by a lower threshold reflection coefficient $|S_{11}|$ of −12 dB and an upper threshold reflection coefficient $|S_{11}|$ of −8 dB. A determined reflection coefficient $|S_{11}|$ falling within this range indicates that no human body is in proximity to the communication device, while any determined reflection coefficient $|S_{11}|$ falling outside of this range indicates that a human body may be in proximity to the device.

It is contemplated that mobile communication device 100 (FIGS. 1 and 2) will be sensed to be in proximity to a human body when it has been raised to a talk position by the user (i.e., wherein the device is held against the ear, cheek and mouth of the user's head) and when it is in contact with or is immediately adjacent to the human body (e.g., is held in a body position wherein the device 100 is resting in the user's lap, is attached to the user's belt, is contained within a pocket of the user's clothing, or the like). However, it will be appreciated that the distance the mobile communication device 100 must be held away from the human body to prevent unwanted exposure of the body to radiation will depend on the power and frequency of the device, and may vary depending on specific design requirements of the device and the air interface standard utilized. Thus, the distance at which the mobile communication device 100 is considered to be in proximity of a human body when not in contact with or immediately adjacent to the body whereupon the human body proximity signal 120 is generated may vary accordingly.

Those of skill in the art will appreciate that system 110 may utilize sensor assemblies 112 employing sensor technologies that do not use the antenna 118 of the mobile communication device 100 for detecting the proximity of a human body. For example, the exemplary sensor assembly 112 shown in FIG. 1 may instead employ a thermal or optical sensing technologies without departing from the scope and spirit of the invention. However, the sensing technology described herein is advantageous because, by measuring reflected radio frequency energy, it indirectly measures interaction with the human body including losses described by the device's SAR value. Thus, proximity of the mobile communication device to the body, which would raise the SAR value of the device, may be more readily detected. Further, because the sensor assembly detects a human body using radio frequency radiation, it may be capable of sensing the proximity of a human body regardless of orientation of the mobile communication device 100 (e.g., the device is placed in the user's lap, or is placed in a pocket of the user's clothing). Moreover, by utilizing existing components (e.g., the antenna) of the mobile communication device 100, integration of the system 110 of the present invention in the mobile communication device 100 is simplified.

Figure 6:
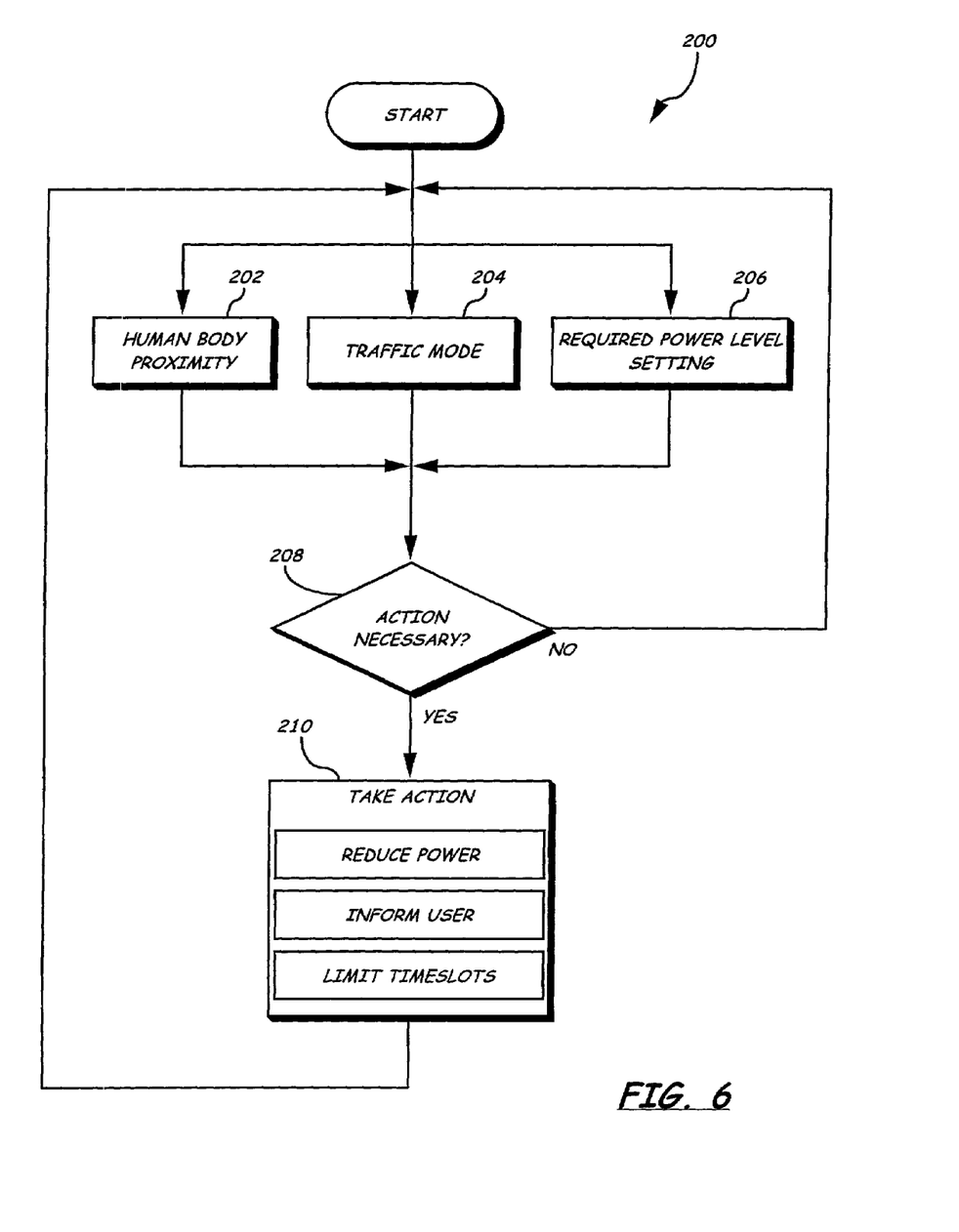
FIG. 6 is a flow diagram illustrating an exemplary method for reducing the SAR value of a mobile telephone by reducing the average radiated power of the telephone when the telephone is in proximity to the human body in accordance with the present invention.

Turning now to FIG. 6, a method 200 for controlling the SAR value of a mobile communication device by controlling the average power of radio frequency electromagnetic energy radiated by the device when the device is in proximity to a human body is described. In exemplary embodiments, the mobile communication device may be capable of operation in multiple modes including at least one mode wherein the device is suitable for use in proximity to a human body and at least one mode wherein the device is unsuitable for use in proximity to a human body due to the power of the radio frequency electromagnetic energy normally being radiated. For instance, as described in the discussion of FIG. 1, the mobile communication device may be capable of operating in a first traffic mode suitable for communication of voice information (e.g., a "talk mode"), and a second traffic mode suitable for communication of data (e.g., a "data transmission mode"). In a talk mode, the mobile communication device may transmit voice information or, alternately, data information (e.g., Short Message Service (SMS) data, or the like) at a low data transmission rate utilizing a single timeslot. In a data transmission mode, the mobile communication device may employ additional timeslots for transmission of data information at higher data transmission rates, increasing the average power of radio frequency energy being radiated by the mobile communication device.

As shown in FIG. 6, a determination is made, at step 202, whether the device is in proximity to a human body. Similarly, determinations are made as to what traffic mode is requested (i.e., how many timeslots are being used), at step 204, and what power level setting is required, at step 206. The results of these determinations are then utilized to ascertain if action to limit the SAR value of the mobile telephone is required, at step 208. In exemplary embodiments, when the mobile communication device is determined to not be in proximity to a human body or the device is determined to be in a talk mode (i.e., only one TDMA timeslot is used during transmission) or, alternately, in a data transmission mode wherein the power being radiated is determined to be sufficiently low so that the device is suitable for use in proximity to the body, no action is required. However, when the mobile communication device 100 is determined to be in proximity to a human body and the device is determined to be in a data transmission mode wherein two or more TDMA timeslots may be used during transmission and the power level required may be expected to make the device unsuitable for use in proximity to the body, action is determined to be required, at step 208. Appropriate action may then be taken, at step 210. For instance, a reduction in the average power level of the mobile communication device may be effected. In exemplary embodiments, the power level within a used time slot may be stepped down to a level wherein the average power of radio frequency electromagnetic energy being radiated the mobile communication device does not cause the device to exceed a predetermined SAR limit. When the mobile communication device is removed from the proximity of the body, the power may again be increased, if necessary.

If the reduction in the power level necessary to avoid causing the mobile communication device to exceed an acceptable SAR limit would cause the power level to be reduced below the required power level needed to maintain adequate signal strength, the power level may be reduced only to the point necessary to maintain adequate signal strength, at step 210. In such situations, the mobile communication device may be prevented from using multiple timeslots. Further, a warning may be provided to the user (e.g. displayed on the mobile communication device's display or the like). In this manner, overall reduction if the SAR value for the mobile communication device is still achieved without unnecessary interruption of data communication. Alternately, the power level may be reduced as required regardless of signal strength, in which case the communication link may be dropped. In this manner, the SAR value of the mobile communication device may be reduced as needed, for example, to meet a SAR value requirement imposed by a governmental body, consumer group, or the like.

In exemplary embodiments, a human body proximity signal provided by a sensor such as sensor assembly 112 (FIG. 1), together with information about the active traffic mode and the current power level of the mobile communication device are utilized to ascertain the average power level of the device, and to determine whether a reduction in the power level is necessary and to what extent, at step 208. In this manner, the average power of radio frequency energy radiated by the mobile communication device is reduced only when needed (i.e., when a human body is in proximity to the antenna of the mobile communication device and the device is operating at a power level wherein separation of the device from the body is desirable). Thus, it becomes possible to adjust the power level of the mobile communication device to avoid violating the SAR limit for the device without substantial impact to the ability of the device to provide communication of data.

Figure 7:
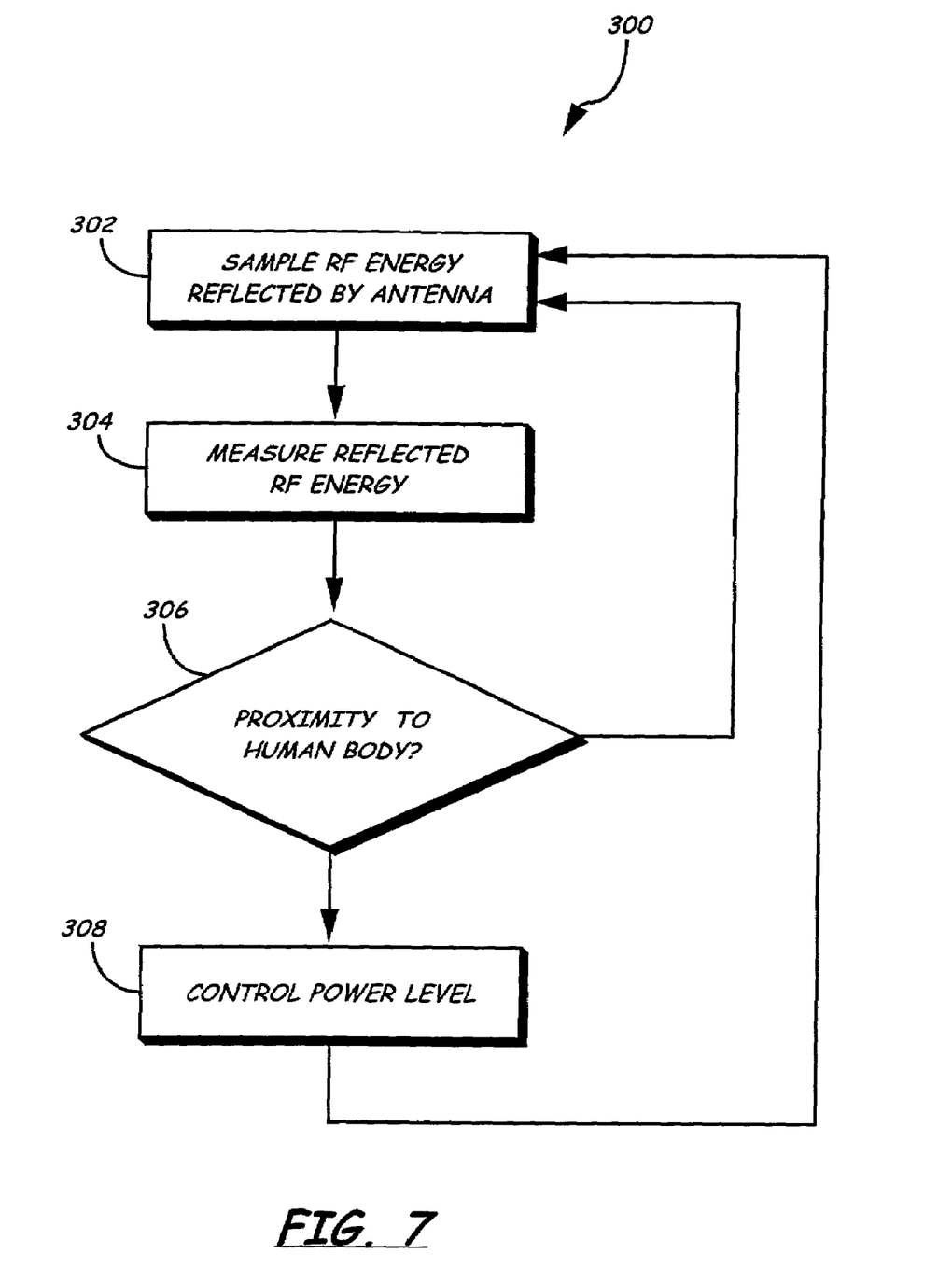
FIG. 7 is a flow diagram illustrating an exemplary method for sensing proximity of the mobile communication device to a human body.

Referring now to FIG. 7, a method 300 for sensing the proximity of a human body is described. In the exemplary embodiment shown, upon radio frequency transmission from the device, radio frequency electromagnetic energy reflected by an antenna is sampled, for example, by a sensor assembly such as sensor assembly 112 (FIG. 2), at step 302. The reflected energy is then measured at step 304, and a determination made whether the mobile communication device is in proximity to the human body, at step 306. The result of this determination is then utilized in combination with information about the current traffic mode and required power level for controlling the power level of the mobile communication device, at step 308.

Figure 4:
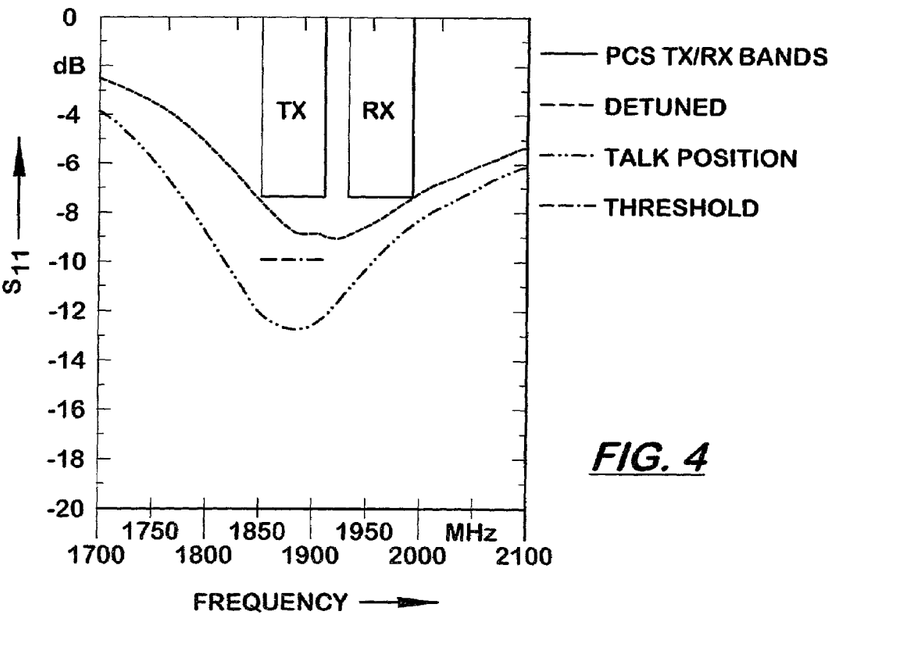
FIGS. 4 and 5 are graphs illustrating reflection coefficients $|S_{11}|$ of exemplary mobile communication device antennas for different positions of the device.
Figure 5:
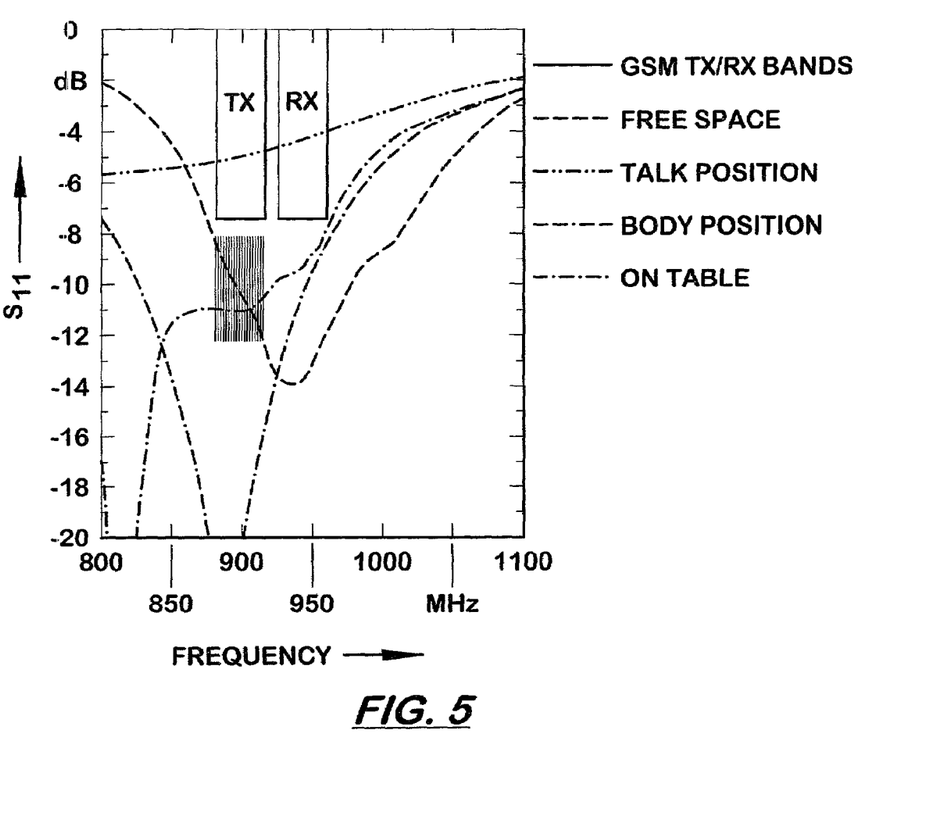

In exemplary embodiments of the invention, a reflection coefficient $|S_{11}|$ is calculated from the reflected radio frequency electromagnetic energy (see FIGS. 4 and 5). A determination may then be made whether this reflection coefficient $|S_{11}|$ deviates from a predetermined reflection for the mobile communication device in free space, such deviation indicating proximity to a human body. For instance, in one embodiment, the antenna is detuned when no body is present. Proximity of the mobile communication device to a human body is determined to exist when the calculated reflection coefficient $|S_{11}|$ falls below a predetermined threshold reflection coefficient. Alternately, the antenna is not detuned. A range of reflection coefficients $|S_{11}|$ where the mobile communication device is not in proximity to a human body is defined for the antenna of the device within a transmit band (Tx) of the device. This range is bounded by a lower threshold reflection coefficient and an upper threshold reflection coefficient. Thus, the mobile communication device is ascertained to not be in proximity to the human body when the determined reflection coefficient $|S_{11}|$ for the antenna is greater than the lower threshold reflection coefficient and less than the upper threshold reflection coefficient. All other determined reflection coefficients $|S_{11}|$ indicate proximity to the body.

Although the invention has been described with a certain degree of particularity, it should be recognized that elements thereof may be altered by persons skilled in the art without departing from the scope and spirit of the invention. It is understood that the specific orders or hierarchies of steps in the methods 200 and 300 illustrated in FIGS. 6 and 7, respectively, are examples of exemplary approaches. Based upon design preferences, it is understood that the specific orders or hierarchies of these methods can be rearranged while remaining within the scope of the present invention. The accompanying method claims present elements of the various steps of methods 200 and 300 in a sample order, and are not meant to be limited to the specific order or hierarchy presented. It is believed that the of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for controlling the average power and duration of radio frequency electromagnetic energy radiated by a mobile communication device, comprising:

an antenna having an impedance that is alterable for changing the amount of radio frequency electromagnetic energy provided to the antenna via an antenna feed and reflected onto the antenna feed when the antenna is in proximity to a body, the antenna being detuned when not in proximity to the body and becoming tuned when in proximity to the body;

a sensor coupled to the antenna for sensing radio frequency electromagnetic energy reflected by the antenna for determining the proximity of the antenna to the body, the sensor determining proximity of the mobile communication device to the body by measuring radio frequency electromagnetic energy reflected by the antenna in the vicinity of the body; and a controller for controlling radiation of radio frequency electromagnetic energy by the mobile communication device, wherein the controller is capable of reducing at least one of the average power and the duration of the radio frequency electromagnetic energy radiated by the mobile communication device when the sensor assembly senses that the mobile communication device is in proximity to the body.

2. The system as claimed in claim 1, the mobile communication device being capable of operating in a first mode wherein the mobile communication device is suitable for use in proximity to the body, and a second mode wherein the mobile communication device is unsuitable for use in proximity to the body, wherein, when the sensor senses that the mobile communication device is in proximity to the body, the controller reduces the average power of the radio frequency electromagnetic energy radiated by the mobile communication device when the mobile communication device is in the second mode.

3. The system as claimed in claim 2, wherein the first mode is suitable for voice communication and the second mode is suitable far data communication.

4. The system as claimed in claim 3, wherein the second mode comprises a General Packet Radio Service (GPRS) data transfer mode.

5. The system as claimed in claim 1, further comprising:

a coupler for directing at least a part of the radio frequency electromagnetic energy reflected by the antenna to the sensor.

6. The system as claimed in claim 1, wherein the sensor measures the power of the radio frequency electromagnetic energy reflected by the antenna, and wherein the power of the radio frequency electromagnetic energy reflected by the antenna decreases when the mobile communication device is in proximity to the body.

7. The system as claimed in claim 1, wherein the controller determines a reflection coefficient from the radio frequency electromagnetic energy reflected by the antenna, and wherein the determined reflection coefficient deviates from a predetermined reflection coefficient for the antenna in free space when the mobile communication device is in proximity to the body.

8. The system as claimed in claim 7, wherein when the determined reflection coefficient for the antenna is one of greater than a lower threshold reflection coefficient and less than an upper threshold reflection coefficient within a transmit band of the mobile communication device, the mobile communication device is determined to be not in proximity to the body.

9. A system for controlling the average power and duration of radio frequency electromagnetic energy radiated by a mobile communication device, comprising:

means for sensing when the mobile communication device is in proximity to a body, the sensing means including means for receiving radio frequency electromagnetic energy reflected by an antenna having an impedance that is alterable for changing the amount of radio frequency electromagnetic energy provided to the antenna via an antenna feed and reflected onto the antenna feed when the antenna is in proximity to the body, the antenna being detuned when not in proximity to the body and becoming tuned when in proximity to the body and means for sensing radio frequency electromagnetic energy within a predetermined frequency band, the proximity of the mobile communication device to the body being determined by measuring radio frequency electromagnetic energy reflected by the antenna; and means for controlling the average radiation of radio frequency electromagnetic energy by the mobile communication device, wherein the controlling means is capable of reducing at least one of the power and the duration of the radio frequency electromagnetic energy radiated by the mobile communication device when the mobile communication device is in proximity to the body.

10. The system as claimed in claim 9, the mobile communication device being capable of operating in a first mode wherein the mobile communication device is suitable for use in proximity to the body and a second mode wherein the mobile communication device is unsuitable for use in proximity to the body, wherein, when the sensing means senses that the mobile communication device is in proximity to the body, the controlling means reduces the average radiated power of the mobile communication device when the mobile communication device is in the second mode.

11. The system as claimed in claim 10, wherein the first mode is suitable for voice communication and the second mode is suitable for data communication.

12. The system as claimed in claim 11, wherein the second mode comprises a General Packet Radio Service (GPRS) data transfer mode.

13. The system as claimed in claim 9, the sensing means further comprising:
means for directing at least a part of the radio frequency electromagnetic energy reflected by the antenna to the sensor.

14. A system for controlling the avenge power of radio frequency electromagnetic energy radiated by a mobile communication device, the mobile communication device being capable of operating in a first mode wherein the mobile communication device is suitable for use in proximity to a human body and a second mode wherein the mobile communication device is unsuitable for use in proximity to the human body, the system comprising:

a sensor assembly for detecting when the mobile communication device is in proximity to the human body, the sensor assembly including an antenna having an impedance that is alterable for changing the amount of radio frequency electromagnetic energy provided to the antenna via an antenna feed and reflected onto the antenna feed when the antenna is in proximity to the body, the antenna being detuned when not in proximity to the body and becoming tuned when in proximity to the body and a sensor coupled to the antenna for sensing radio frequency electromagnetic energy reflected by the antenna for determining the proximity of the antenna to the body, the sensor determining proximity of the mobile communication device to the human body by measuring radio frequency electromagnetic energy reflected by the antenna; and a controller for controlling radiation of radio frequency electromagnetic energy by the mobile communication device, wherein the controller is capable of reducing the average power of the radio frequency electromagnetic energy radiated by the mobile communication device when the mobile communication device is in the second mode and the sensor assembly senses that the mobile communication device is in proximity to the human body.

15. The system as claimed in claim 14, wherein the first mode is suitable for voice communication and the second mode is suitable for data communication.

16. The system as claimed in claim 15, wherein the second mode comprises a General Packet Radio Service (GPRS) data transfer mode.

17. The system as claimed in claim 14, wherein the controller ascertains a minimum power level for maintaining a communication link such that the power of the radio frequency electromagnetic energy radiated by the mobile communication device is not reduced below the minimum power level.

18. The system as claimed in claim 14, the sensor assembly further comprising:
a coupler for directing at least a part of the radio frequency electromagnetic energy reflected by the antenna to the sensor.

19. The system as claimed in claim 14, wherein the sensor measures the power of the radio frequency electromagnetic energy reflected by the antenna, and wherein the power of the radio frequency electromagnetic energy reflected by the antenna decreases when the mobile communication device is in proximity to the human body.

20. The system as claimed in claim 14, wherein the sensor determines a reflection coefficient from the radio frequency electromagnetic energy reflected by the antenna, and wherein the determined reflection coefficient deviates from a predetermined reflection coefficient for the antenna in free space when the mobile communication device is in proximity to the human body.

21. The system as claimed in claim 20, wherein when the determined reflection coefficient for the antenna is one of greater than a lower threshold reflection coefficient and less than an upper threshold reflection coefficient within a transmit band of the mobile communication device, the mobile communication device is determined to be not in proximity to the human body.

22. A method for controlling the Specific Absorption Rate (SAR) value of a mobile communication device, the mobile communication device being capable of operating in a first mode wherein the mobile communication device is suitable for use in proximity to a human body and a second mode wherein the mobile communication device is unsuitable for use in proximity to the human body, the method comprising the steps of:

determining whether the mobile communication device is operating in the first mode or the second mode;

sensing when the mobile communication device is in proximity to the human body by sampling radio frequency electromagnetic energy reflected by an antenna, the antenna being detuned when not in proximity to the body and becoming tuned when in proximity to the body and measuring the reflected radio frequency electromagnetic energy for determining the proximity of the mobile communication device to the human body; and reducing the avenge radiated power of the mobile communication device when the mobile communication device is in the second mode and is in proximity to the human body.

23. The method as claimed in claim 22, further comprising ascertaining a minimum power level for maintaining a communication link such that the power of the radio frequency electromagnetic energy radiated by the mobile communication device is not reduced below the minimum power level.

24. The method as claimed in claim 22, wherein the power of the reflected radio frequency electromagnetic energy is measured, the power of the reflected radio frequency electromagnetic energy being decreased when the mobile communication device is in proximity to the human body.

25. The method as claimed in claim 22, further comprising determining a reflection coefficient from the reflected radio frequency electromagnetic energy, wherein the determined reflection coefficient deviates from a predetermined reflection when the mobile communication device is in proximity to the human body.

26. The method as claimed in claim 25, further comprising ascertaining that mobile communication device is not in proximity to the human body when the determined reflection coefficient for the antenna is greater than a lower threshold reflection coefficient and less than an upper threshold reflection coefficient within a transmit band of the mobile communication device.

27. A mobile communication device capable of operating in a first mode wherein the mobile communication device is suitable for use in proximity to a human body and a second mode wherein the mobile communication device is unsuitable for use in proximity to the human body, the mobile communication device comprising:
   an antenna having an impedance that is alterable for changing the amount of radio frequency electromagnetic energy provided to the antenna via an antenna feed and reflected onto the antenna feed when the antenna is in proximity to the body, the antenna being detuned when not in proximity to the body and becoming tuned when in proximity to the body;
   a sensor for sensing radio frequency electromagnetic energy reflected by the antenna for determining the proximity of the antenna to the body, the sensor determining proximity of the mobile communication device to the body by measuring radio frequency electromagnetic energy reflected by the antenna in the vicinity of the body; and
   a controller for controlling radiation of radio frequency electromagnetic energy by the mobile communication device,
   wherein the controller is capable of reducing at least one of the average power and duration of the radio frequency electromagnetic energy radiated by the mobile communication device when the mobile communication device is in the second mode and the sensor senses that the mobile communication device is in proximity to the human body.

28. The mobile communication device as claimed in claim 27, wherein the first mode is suitable for voice communication and the second mode is suitable for data communication.

29. The mobile communication device as claimed in claim 27, wherein the controller ascertains a minimum power level for maintaining a communication link between the mobile communication device and a second communication device, such that the power of the radio frequency electromagnetic energy radiated byte mobile communication device is not reduced below the minimum power level.

30. The mobile communication device as claimed in claim 27, further comprising:
   a coupler for directing at least a part of the radio frequency electromagnetic energy reflected by the antenna to the sensor.

31. The mobile communication device as claimed in claim 27, wherein the sensor measures the power of the radio frequency electromagnetic energy reflected by the antenna, the power of the radio frequency electromagnetic energy reflected by the antenna being decreased when the mobile communication device is in proximity to the human body.

32. The mobile communication device as claimed in claim 30, wherein the controller determines a reflection coefficient from the radio frequency electromagnetic energy reflected by the antennas and wherein the determined reflection coefficient deviates from a predetermined reflection coefficient for the antenna in free space when the mobile communication device is in proximity to the human body.

33. The mobile communication device as claimed in claim 32, wherein when the determined reflection coefficient for the antenna is one of greater than a lower threshold reflection coefficient and less than an upper threshold reflection coefficient within a transmit band of the mobile communication device, the mobile communication device is determined to be not in proximity to the human body.

* * * * *